United States Patent [19]

Plank et al.

[11] Patent Number: 4,878,679

[45] Date of Patent: Nov. 7, 1989

[54] VARIABLY OPERABLE HAND-HELD DEVICE

[75] Inventors: Uto Plank, Freising; Anton Neumaier, Fürstenfeldbrück; Erwin Manschitz, Germering, all of Fed. Rep. of Germany

[73] Assignee: Hilti Aktiengesellschaft, Fürstentum, Fed. Rep. of Germany

[21] Appl. No.: 214,491

[22] Filed: Jul. 1, 1988

[30] Foreign Application Priority Data

Jul. 1, 1987 [DE] Fed. Rep. of Germany ....... 3721771

[51] Int. Cl.$^4$ .............................................. B23B 31/04

[52] U.S. Cl. .................................. 279/19.4; 279/1 B; 408/9

[58] Field of Search ............... 279/1 B, 19, 19.3, 19.4, 279/19.5, 1 R, 1 TS; 408/8, 9, 16, 116

[56] References Cited

U.S. PATENT DOCUMENTS 3,587,361 6/1971 Smith .................................... 408/16
4,413,936 11/1983 Kuhlmann ........................ 173/11 X
4,491,444 1/1985 Rumpp et al. ................. 279/19.4 X
4,592,560 6/1986 Neumaier et al. .................... 279/81

FOREIGN PATENT DOCUMENTS 3228303 2/1984 Fed. Rep. of Germany ........ 408/16
3637128 5/1988 Fed. Rep. of Germany .......... 408/8

*Primary Examiner*—Steven C. Bishop
*Attorney, Agent, or Firm*—Toren, McGeady & Associates

[57] ABSTRACT

A hand-held device, such as a hammer drill, has a replaceable axially extending holder for a working tool. The device includes a sensor and a signal transmitter for adjusting its operating characteristics. The holder has through openings containing locking elements and control elements. The locking elements and control elements are radially displaceable within the through openings by a locking sleeve. The position of the locking sleeve in the axial direction of and relative to the holder determines the cooperation of the sensor and the signal transmitters.

10 Claims, 1 Drawing Sheet

VARIABLY OPERABLE HAND-HELD DEVICE

BACKGROUND OF THE INVENTION

The present invention is directed to a hand-held device including a working tool holder detachably connected to a driven spindle by elements which are radially displaceable by a rotatable adjusting ring. The holder has through openings for locking elements which secure a working tool in the holder by engaging corresponding recesses in the tool. The locking elements are radially displaceable by means of a rotatable or axially displaceable locking sleeve.

Various working tool systems are presently known. These working tool systems are distinguishable from one another by the different tool shanks or insertion ends. Though there is a great variety of such working tools, a tool shank with groove-shaped recesses in which radially displaceable locking elements of a tool holder in a hand-held device engage, has received the most use. Since working tools vary considerably with respect to their working diameter, this widely used insertion end has been utilized in two diameters. As a result, more powerful hand-held devices have a working tool holder for a tool shank having a larger diameter, and less powerful hand-held devices have a working tool holder for a tool shank with a smaller diameter.

Since the technology involved in the development of hand-held devices has continued to develop rapidly, it is possible to provide such devices where the output is variable for operating working tools with a small working diameter as well as tools with a large working diameter. It is necessary to adjust the device to the required output or operating characteristics of the working tool.

Accordingly, there is a known sensing mechanism disclosed in DE OS 29 43 508 for transmitting a signal to the device for adjusting the operating characteristics based on the working tool inserted into the device.

The problem involved in adapting the working tools of different diameters to the hand-held device have not been solved. In DE OS 33 10 371, an example of the fast-locking arrangement between a working tool holder and the driven spindle of the device is shown where a holder for the insertion end or shank of a tool with a large or small diameter can be locked on the driven spindle based on the type of working tool employed. Accordingly, an interface between the working tool holder and the driven spindle of the device is provided which has advantages relative to construction on one hand, however, on the other hand, there is the disadvantage that this arrangement cannot afford data transmission from the working tool to the device.

SUMMARY OF THE INVENTION

Therefore, the primary object of the present invention is to provide a hand-held device with a replaceable working tool holder where the replacement can be carried out in a simple manner and where the proper operation of the device based on the working tool is insured though the holder has been replaced.

In accordance with the present invention, a tubular shaped holder contains control elements supported in through openings so that the elements can be radially displaced by a locking sleeve with one of rotation or axial displacement of the locking sleeve being available for radially displacing locking elements when the control elements engage within recesses in the shank of the working tool.

The combination of a control element, in accordance with the present invention, with the known working tool locking arrangement, has the advantage that only working tools adapted to the corresponding tool holder can be inserted in accordance with the working tool system being used. Accordingly, the working tool and the hand-held device form a correct system unit in accordance with the device output. If it is attempted to use a working tool not in conformity with the system, for example, there is no recess for a control element, the tool can be locked in the device but the control element will be unable to transmit information relating to the tool system.

The control elements can be in the form of balls supported in openings in the holder for radial movement. Preferably, the diameter of the openings decrease in the inward direction toward the bore in the holder so that the control elements do not fall out when a working tool is not inserted into the holder.

In principle, there are different possibilities in the arrangement of the control elements. Accordingly, one or more control elements can be used spaced around the circumference of the holder. I would also be possible to provide a plurality of control elements located in spaced relation relative to the axis of the working tool holder. Therefore, in combination with recesses arranged in a corresponding manner in the shank of the working tools, a great number of coding possibilities are available, whereby working tools of different types and different diameters can provide corresponding coded information. Preferably, the control elements and the locking elements have a dimension in the radial direction so that the elements project from the wall of the holder, whereby it is possible to use the bearing wall surface of the locking sleeve as a control contour for displacing the control elements and locking elements. The bearing wall surface is supported on the outer surface of the holder. The radial dimension of the control elements can be different from that of the locking elements. In particular, a smaller radial dimension of the control elements is advantageous so that the corresponding recesses in the shanks of the working tools are smaller than the recesses for the locking elements. Accordingly, an unnecessary weakening of the shanks of the working tools can be avoided.

To displace the locking elements and the control elements out of the central bore in the holder, deflecting recesses are provided preferably in the locking sleeve. Separate deflecting recesses can be provided for each element, or a deflecting recess can be provided jointly for the control elements and the locking elements for the purpose of constructional simplicity.

Preferably, the deflecting recesses are located axially closer to the entrance to the holder than the bearing wall surface of the locking sleeve. The bearing wall surface, as mentioned above, forms a control contour within the sleeve. If the locking sleeve is axially displaceable, the deflecting recesses are axially adjacent to the bearing wall surface within the locking sleeve. In a rotatable locking sleeve, the deflecting recesses are adjacent to the bearing wall surface in the circumferential direction of the locking sleeve. In this arrangement, the bearing wall surface also forms a control contour. Further, a deflecting recess, serving both the locking elements and the control elements afford a substantial simplification of the locking sleeve, particularly if the sleeve is axially displaceable, since the recesses can be produced as a recess with a larger diameter.

Advantageously, the deflecting recesses for the locking elements are spaced further from the opening into the holder than the deflecting recesses for the control element. Moreover, a limiting shoulder extending transversely of the axial direction of the holder for the deflecting recesses for the locking elements is positioned further from the opening into the holder than the limiting shoulder of the deflecting recesses for the control elements. When the locking sleeve is displaced, the locking elements are moved into the recesses in the shank of the working tool before the locking sleeve acts on the control elements. Accordingly, it is assured that the working tools without recesses for control elements can be locked within the holder, however, the position of the locking element prevents any transmission of information in accordance with the tool system being used. It is advantageous both for simple handling of the device and for production, if the locking sleeve is axially displaceable relative to the holder.

In another feature of the invention, the locking sleeve includes engagement elements for meshing with opposed elements on an adjustment ring when the locking sleeve is axially displaced toward the trailing end of the holder, that is, when the sleeve is displaced for allowing the locking elements and the control elements to move outwardly into the deflecting recesses. By the engagement of the carrier elements on the locking sleeve and the adjustment ring, it is possible to rotate the adjustment ring for replacing the working tool holder without the use of any special auxiliary tools. Preferably, the carrier elements are in the form of interengageable teeth.

In another preferred feature, spring means are provided for biasing the locking sleeve into position for displacing the locking elements and the control elements radially inwardly into the recesses in the shank of the working tool. As a result, locking a working tool in the holder is simplified with regard to handling of the device. The locking sleeve must be displaced axially against the force of the spring to remove a working tool. Accordingly, locking a working tool in the holder is effected automatically due to the spring means which bias the locking sleeve toward the leading end of the holder.

In another feature of the invention, signal transmitters cooperating with sensing devices are located in the housing of the device and in the locking sleeve. The signal transmitters and sensing devices become operational when the locking sleeve is in position with the locking elements and the control elements held in the recesses in the shank of the working tool. A magnet ring cooperating inductively with the sensing devices is suitable as a signal transmitter. The sensing devices transmit electric signals for adjusting the operation of the device. Preferably, the magnet ring cooperates with a sensing device when a working tool provided with recesses for the control elements for coding purposes is locked in the holder. If, on the contrary, a working tool is inserted which does not have the required recesses, the signal transmitter is not positioned in the region of the sensing device and, consequently, there is no transmission of a signal for controlling the operation of the device. Accordingly, when such a working tool is positioned in the holder, it is operated by the hand-held device based on predetermined operating characteristics.

In accordance with the present invention, with the interengagement between the driven spindle of the device and the working tool holder, it is possible to transmit operational data from the working tool to the device. By arranging a number of sensing devices and signal transmitters in different positions, different working tool holders can be utilized in the same device, however, the sensing devices and signal transmitters only cooperate with a particular working tool holder so that the requisite transmission of information takes place. For example, the sensing devices are provided in the device at different positions and signal transmitters are arranged at different positions in the locking sleeve for the different working tool holders so that a signal transmitter of a particular working tool holder is assigned to a specific sensing device when the working tool is located in its final position, that is, when both the locking elements and the control elements are moved radially inwardly into the corresponding recesses in the shank of the working tool.

Such replacement of the working tool holders provides that the operating data is always provided in the device with the same working tool holder for a determined assortment of working tools. Such an assortment of working tools can be made up of a diametrical range of the working tool shanks. Within the working tool assortment, wherein the same operating data is always triggered in the device by the working tool holder, and the coding on the working tools, further data can be transmitted within an assortment by additional coding information assigned to the individual working tool. Such additional information can be transmitted to the device, for example, from an additional control element of a separate member with the additional control element sensing the configuration of the working tool. Accordingly, it is possible to provide two separate data transmission systems from the working tool to the device, with one system determining data of an entire working tool assortment based on the working tool holder, while the other system determines data of individual working tools within an assortment via separate transmission members.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
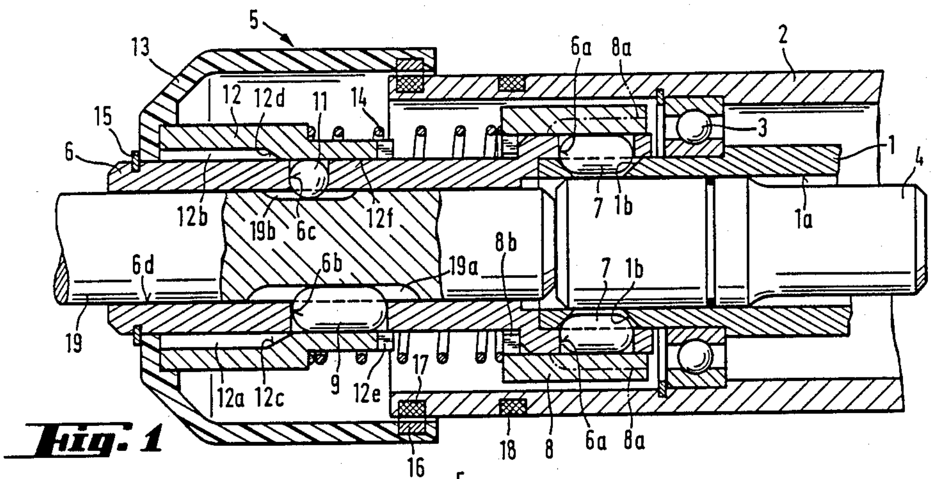
FIG. 1 is an axially extending sectional view of the front region of a hand-held device including a working tool holder and an inserted working tool in accordance with the present invention.
Figure 2:
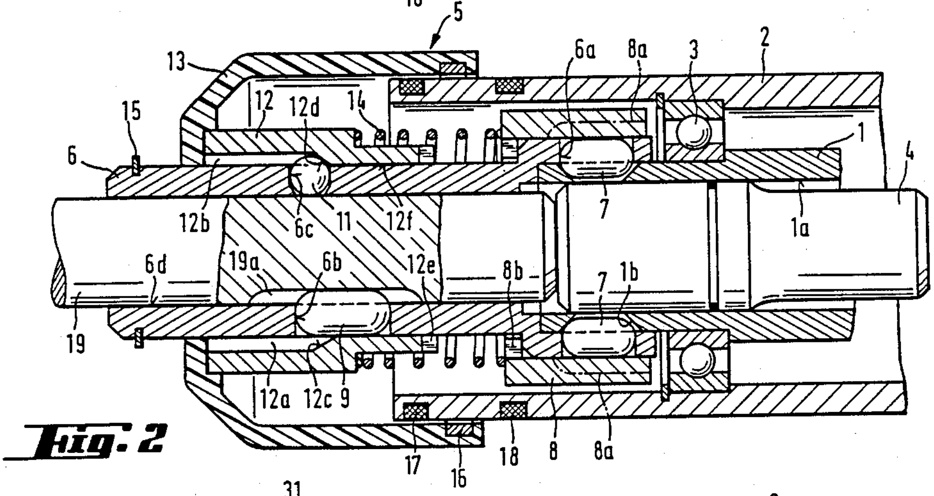
FIG. 2 is a sectional view similar to FIG. 1, however, with a working tool inserted into the holder different from that illustrated in FIG. 1.
Figure 3:
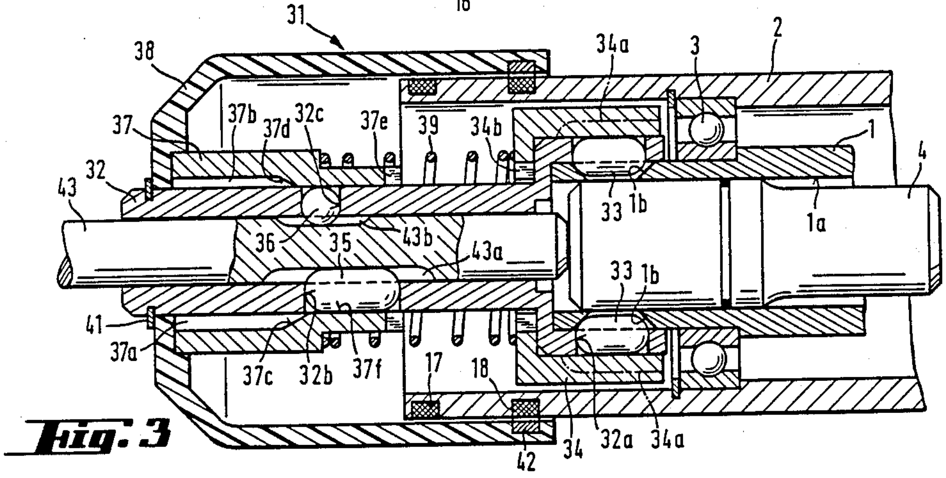
FIG. 3 is a sectional view of the hand-held device similar to FIGS. 1 and 2, however, with a working tool holder sized for receiving working tools of a smaller diameter than shown at FIG. 1 and 2.

In FIGS. 1, 2 and 3, the front end of a hand-held device, such as a hammer drill, is illustrated. In the description which follows the individual parts of the device are characterized as having a leading end and a trailing end. The leading end is the left-hand end and the trailing end is the right-hand end as viewed in the drawing. Accordingly, only an axially extending portion of the device is shown extending from its leading end toward the trailing end.

In FIG. 1, the device includes an axially extending hollow driven spindle 1 with only the leading end portion of the the spindle being illustrated. The spindle is driven so that it rotates. Spindle 1 is located within a housing 2 of the device with only an axially extending part of the housing extending from its leading end toward its trailing end being shown. Spindle 1 is rotatably supported in the housing 2 by a rolling element bearing 3. The spindle has an axially extending bore **1*a*, with a striking or percussion anvil 4 axially displaceably supported in the bore. Anvil 4 is reciprocated within the bore 1*a*** by a known percussion mechanism, not shown.

A working tool holder 5 is mounted on the leading end of the driven spindle 1. Holder 5 includes an axially extending tubular holder member 6 fitted onto the leading end of the driven spindle 1. Roller-shaped elements 7 are positioned in through openings in the holder member 6 for interconnecting the holder member on the driven spindle 1 so that the holder member and the spindle rotate together. For the co-rotation of the holder member 6 and the spindle 1, the elements 7 extend inwardly from the openings **6*a* into aligned openings 1*b* in the spindle 1. An adjustment ring 8 laterally enclosing the outer surface of the holder member 6 holds the elements 7 in engagement within the through openings 1*b*, 6*a*. Adjustment ring 8 has deflecting recesses 8*a*, shown in phantom, which can be aligned outwardly from the through openings 1*b*, 6*a* by rotating the ring relative to the holder member 6. With the deflecting recesses 8*a* aligned radially outwardly from the through openings 6*a*, the elements 7 can move radially outwardly out of the through openings 1*b* and the holder 5 can be removed from the driven spindle 1**.

Holder member 6 has at least one additional through opening **6*b* spaced from the through opening 6*a* toward the leading end of the holder member. A roller-shaped locking element 9 is located in the through opening 6*b*. Further, another through opening 6*c* for a control element 11 in the form of a ball is located in the holder member 6 and the trailing end of the through opening 6*b* is spaced further from the leading end of the holder member than the trailing end of the through opening 6*c*. A locking sleeve 12 is slidably displaceably supported on the outside surface of the holder member 6. An actuating collar 13 is secured to the locking sleeve 12 adjacent the leading end of the locking sleeve. The radially outer surface of the locking sleeve 12 has a stepped configuration and a compression spring 14 is seated at one end against the stepped outer surface of the locking sleeve and at the other end against the adjustment ring 8 so that the spring biases the locking sleeve and the actuating collar against a stop ring 15 encircling and secured to the outer surface of the holder member 6 adjacent its leading end. In the axial position of the locking sleeve 12, as displayed in FIG. 1, a magnet ring 16 is located in the inner surface of the actuating collar 13 adjacent its trailing end. Radially inwardly from the magnet ring 16 is a sensing device 17 located in the outer surface of the housing 2 adjacent its leading end. An additional sensing device 18 is located in the outer surface of the housing 2 and is spaced in the axial direction from the sensing device 17 toward the trailing end of the housing. A shank end 19 of a drilling working tool extends into the leading end of a bore 6*d* in the leading end portion of the holder member 6. The bore 6*d* is coaxial with the bore 1*a* in the spindle 1 and has a smaller diameter than the bore 1*a*. The shank end 19 projects at its trailing end from the bore 6*d* into the bore 1*a* so that it can be impacted by the leading end of the anvil 4. Shank end 19 has a groove-shaped recess 19*a* extending in the axial direction for receiving the locking element 9. The combination of the recess 19*a* and the locking element 9 provide both axial retention and rotational drive between the holder member 6 and the working tool. As shown in FIG. 1, the shank end 19 has another recess 19*b* extending in the axial direction, however, the recess 19*b* is shorter in the axial direction that the recess 19*a* and its trailing end is spaced further from the trailing end of the shank end than the trailing end of the recess 19*a*. Control element 11 engages in the recess 19*b*. The locking element 9 and the control element 11 are held in the corresponding recesses 19*a*, 19*b* by a bearing wall surface 12*f* formed on the inside of the locking sleeve. Bearing wall surface 12*f*** serves as a control contour.

To remove a working tool from the holder, both the locking element 9 and the control element 11, as shown in FIG. 1, must move radially outwardly. To achieve such outward movement, locking sleeve 12 is displaced against the biasing action of the spring 14 toward the trailing end of the device so that deflecting recesses **12*a*, 12*b* in the leading end portion of the locking sleeve align outwardly with the openings 6*b*, 6*c* in the holder member 6 whereby the locking element 9 and the control element 11 can move radially outwardly. Each deflecting recesses 12*a*, 12*b* has a corresponding inclined limiting shoulder 12*c*, 12*d* at its trailing end for effecting engagement of the locking element 9 and the control element 11 when the locking sleeve 12** is returned toward the leading end of the device.

Locking sleeve 12 and adjustment ring 8 each has engagement members facing one another in the form of teeth **12*e*, 8*b*, that is, the teeth 12*e* are located at the trailing end of the locking sleeve while the teeth 8*b* are located at the leading end of the adjustment ring. To replace the working tool holder 5, locking sleeve 12 is displaced axially toward the trailing end of the device until the teeth 12*e*, 8*b* interengage so that the adjustment ring 8 can be rotated by the locking sleeve 12. When adjustment ring 8 is rotated by the locking sleeve 12, the deflecting recesses 8*a* in its inner surface align outwardly with the elements 7 so that the elements can move radially outwardly into the recesses. As a result, the retention of the holder 5** is released and it can be withdrawn from the leading end of the device and replaced by another holder.

Working tool holder 5 is also suitable for shank ends of working tools which have e same dimensions but do not include a recess **19*b* for receiving the control element 11. Such a shank end 19 is set forth in FIG. 2. Since the shank end in FIG. 2 does not have a groove-recess 19*b* in its outer surface, the control element bears against the radially outer surface of the shank end and projects outwardly from the outer surface of the holder member 6. Thus, when the locking sleeve 12 is biased toward the leading end of the device by the spring 14, its limiting shoulder 12***d* within the recess 12*b* contacts the control element 11 and prevents any further axial movement of the locking sleeve toward the stop ring 15. This position can be noted in FIG. 2. As a result, the locking sleeve 12 and the actuating collar 13 are held in a position where the magnet ring 16 is located in a neutral position between the sensing devices 17, 18. While magnet ring 16 produces signals inductively in the sensing device in the position shown in FIG. 1 for adjusting the operation of the hand-held device, in the position shown in FIG. 2, no signals are produced. Consequently, when working tools do not have a recess 19*b* for the reception of a control element 11, the hammer drill or hand-held device provides a predetermined standardized operating characteristics, that is, the rate of rotation and the hammer stroke output are predetermined in a fixed manner. In principle, it is also possible to arrange a plurality of sensing devices, one behind the other in the axial direction, to obtain signals for adjusting the operating characteristics which afford a broad range of operations. A plurality of sensing devices can be employed in combination with a plurality of recesses 19*b* and control elements 11.

For the use of working tools with a shank end diameter smaller than that shown in FIGS. 1 and 2, a holder 31 can be provided in place of the holder 5, shaped to receive the smaller diameter as is illustrated in FIG. 3. Holder 31 is connected to the device in the same manner as the holder 5 in FIGS. 1 and 2. In FIG. 3, for the sake of simplicity, parts of the device are provided with the same reference numerals as in the embodiment in FIGS. 1 and 2. Since the holder 31 corresponds essentially to the holder 5 in its construction and operation, further description of the holder is not necessary.

Holder 31 includes an axially extending tubular holder member 32 secured on the leading end of driven spindle 1 by elements 33. Through openings 32*a* in the holder member 32 contain the elements 33. An adjustment ring 34 provides the radial support for the elements 33. Adjustment ring 34 has deflecting recesses 34*a*, shown in phantom, for receiving the elements 33. Further, the leading end of the adjustment ring 34 has teeth 34*b*. The holder member 32 has through openings 32*b*, 32*c*. Locking element 35 is located in the through opening 32*b*, while control element 36 is located within the through opening 32*c*. A locking sleeve 37, axially displaceable on the outer surface of the holder member 32, has deflecting recesses 37*a*, 37*b*, each with a limiting shoulder 37*c*, 37*d* at its trailing end. The trailing end of the locking sleeve 37, facing toward the adjustment ring 34, has teeth 37*e*, for interengagement with the teeth 34*b* on the adjustment ring 34. An actuating collar 38 is secured to the locking sleeve 37. Compression spring 39 biases the locking sleeve 37 along with the actuating collar 38 against a stop ring 41 secured in and extending around the radially outer surface of the holder member 32 adjacent its leading end. As in the arrangement shown in FIGS. 1 and 2, actuating collar 38 has a magnet ring 42 on its inside surface adjacent its trailing end and the magnet ring cooperates with the sensing device 18 as shown in FIG. 3 for inductively producing signals for effecting the operation of the hand-held device.

A shank end 43 of a working tool having a smaller diameter than the shank end 19 of the working tool displayed in FIGS. 1 and 2 fits into the working tool holder 31. The shank end 43 has axially extending recesses 43*a*, 43*b* for receiving the locking element 35 and the control element 36, respectively. The locking element 35 and the control element 36 are held in the radially inward position in the recesses 43*a*, 43*b* by a bearing wall surface 37*f* in the inside surface of the locking sleeve. The bearing wall surface 37*f* acts as a control contour. When the working tool shown in FIG. 3 is inserted into the device, signals are produced in the sensing device 18 for adjusting the operation of the device in accordance with the particular working tool inserted into the holder 31. If a working tool is inserted into the holder 31 with a shank end having the same diameter as the shank end 43 in FIG. 3, but without a recess 43*b* for the control element 36, the limiting shoulder 37*d* is supported against the outwardly displaced control element 36 in a manner similar to that displayed in FIG. 2. As a result, magnet ring 42 is held in a position spaced from the sensing device 18 toward the trailing end of the hand-held device, whereby no signals are produced. Therefore, the hand-held device or hammer drill operates the working tool based on fixed operating information.

While specific embodiments of the invention have been shown and described in detail to illustrate the application of the inventive principles, it will be understood that the invention may be embodied otherwise without departing from such principles.

We claim:

1. Hand-held device comprising an axially elongated driven spindle having a leading end and a trailing end, means for securing a working tool on said spindle, said means for securing a working tool comprises an axially extending tubular shaped holder for receiving a working tool with said holder having a leading end and a trailing end with the trailing end thereof connected to the leading end of said spindle, means for releasably connecting said holder to said spindle, at least one first through opening in said holder spaced axially from said releasable connecting means toward the leading end of said holder, a locking element located within said first through opening, means mounted on and displaceable relative to said holder for radially inwardly displacing said locking elements into engagement with a corresponding recess in a working tool inserted into said holder, at least one second through opening in said holder spaced from said first through opening, a control element located within said second through opening and being displaceable between a radially inner position and a radially outer position, said radially inwardly displacing means also arranged for radially inwardly displacing said control element into the radially inner position into a corresponding recess in a working tool inserted into said holder, whereby the radially inner and outer positions of said control member control the displacement of said radially inwardly displacing means relative to said holder.

2. Hand-held device, as set forth in claim 1 wherein said radially inwardly displacing means comprises a locking sleeve encircling and displaceable relative to said holder.

3. Hand-held device, as set forth in claim 2, wherein said locking sleeve is elongated in the axial direction of said holder, said holder has a radially outer surface and said locking sleeve has a bearing wall surface in sliding contact with said radially outer surface of said holder, and said bearing wall surface contacts and displaces said locking element and said control element radially inwardly into corresponding recesses in an inserted working tool.

4. Hand-held device, as set forth in claim 3, wherein the bearing wall surface of said locking sleeve includes deflecting recesses for receiving said locking element and said control element.

5. Hand-held device, as set forth in claim 4 wherein said deflecting recess for said locking element has a trailing end spaced closer to the trailing end of said holder than a trailing end of said deflecting recess for said control element.

6. Hand-held device, as set forth in claim 5, wherein the trailing end of said deflecting recesses for said locking element and control element each form a limiting shoulder, and the through opening for said control element in said holder being locáted more remote from the trailing end of said holder than the trailing end of said through opening for said locking element.

7. Hand-held device, as set forth in claim 6, wherein said locking sleeve is axially displaceable relative to said holder.

8. Hand-held device, as set forth in claim 7 wherein said locking sleeve has a leading end and a trailing end spaced apart in the axial direction of said holder, said adjustment ring has a leading end and a trailing end spaced apart in the axial direction of said holder, engagement members located on the trailing end of said locking sleeve and on the leading end of said adjustment ring, said locking sleeve being axially displaceable relative to said holder from a first position in spaced relation from said adjustment ring to a second position where said engagement members of said locking sleeve and adjustment ring interengage with one another.

9. Hand-held means, as set forth in claim 8, wherein spring means are located in contact with said locking sleeve and said adjustment ring for biasing said locking sleeve into the first position.

10. Hand-held device, as set forth in claim 7, wherein a housing laterally encircles said driven spindle and has a leading end located radially outwardly from said holder, an actuating collar secured to said locking sleeve and being axially displaceable with said locking sleeve, a signal transmitter located in said actuating collar, sensing devices mounted in said housing and spaced apart in the axial direction of said driven spindle, and said signal transmitters being selectively alignable opposite one of said sensing devices when said locking sleeve is located in the first position.

* * * * *

UNITED STATES PATENT AND TRADEMARK OFFICE

CERTIFICATE OF CORRECTION

PATENT NO. : 4,878,679

DATED : November 7, 1989

INVENTOR(S) : Uto Plank et al

It is certified that error appears in the above-identified patent and that said Letters Patent is hereby corrected as shown below:

On the title page:

[73] Assignee: Hilti Aktiengesellschaft, Fürstentum, Liechtenstein

Signed and Sealed this

Sixth Day of November, 1990

*Attest:*

HARRY F. MANBECK, JR.

*Attesting Officer* *Commissioner of Patents and Trademarks*